United States Patent [19]

Ishiwata

[11] Patent Number: 5,126,867
[45] Date of Patent: Jun. 30, 1992

[54] LIQUID CRYSTAL DEVICE HAVING INSULATING AND ALIGNMENT FILMS WHEREIN THREE $\geq$ -CR[-2.3 + LN(C/PS)]

[75] Inventor: Kazuya Ishiwata, Yokosuka, Japan

[73] Assignee: Canon Kabushiki Kaisha, Tokyo, Japan

[21] Appl. No.: 589,269

[22] Filed: Sep. 28, 1990

[30] Foreign Application Priority Data

Sep. 29, 1989 [JP] Japan .................................. 1-252347

[51] Int. Cl.$^5$ ............................................. G02F 1/133
[52] U.S. Cl. ...................................... 359/75; 359/79; 359/100
[58] Field of Search .............. 350/339 R, 350 S, 341, 350/333, 334, 340

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,589,996 | 5/1986 | Inoue et al. | 252/299.65 |
| 4,592,858 | 6/1986 | Higuchi et al. | 252/299.66 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,622,165 | 11/1986 | Kano et al. | 252/299.65 |
| 4,681,404 | 7/1987 | Okada et al. | 350/350 S |
| 4,738,515 | 4/1988 | Okada et al. | 350/350 S |
| 4,836,655 | 6/1989 | Yamazaki | 350/339 R |
| 4,917,470 | 4/1990 | Okada et al. | 350/350 S |
| 4,932,757 | 6/1990 | Hanyu et al. | 350/350 S |
| 5,046,822 | 10/1991 | Matsuda et al. | 359/75 |

FOREIGN PATENT DOCUMENTS

| | | | |
|---|---|---|---|
| 2418022 | 11/1974 | Fed. Rep. of Germany | 350/339 R |
| 54-42633 | 12/1979 | Japan | 350/339 R |

OTHER PUBLICATIONS

W. J. A. Hartmann, "Ferroelectric Liquid-Crystal Video Display" Proceedings of the SID-vol. 30, No. 2, 1989, pp. 99-103.

Ikeno et al., "A Ferroelectric LCD with Gray Scale Capability Using Conventional CTC, Doped Polyimide and/or Undoped LB Polyimide a Alignment Layers" Proceedings of the SID, vol. 30, No. 4, 1989, pp. 329-332.

Miyasato et al., "A Direct Method with Triangular Waves for Measuring Spontaneous Polarization with Ferroelectric Liquid Crystals".

Japanese Journal of Appl. Physics, vol. 229 (10), pp. 661-663, 1983.

Applied Physics Letters, vol. 36, No. 11 (1980) 899:901, Clark et al. "Submicrosecond Bistable Electro-Optic Switching in Liquid Crystals".

Primary Examiner—John S. Heyman
Assistant Examiner—Tai V. Duong
Attorney, Agent, or Firm—Fitzpatrick, Cella, Harper & Scinto

[57] ABSTRACT

A liquid crystal device is formed by disposing a chiral smectic liquid crystal between two groups of electrodes which are disposed opposite to each other and so as to intersect each other. At least one of the two groups of electrodes is covered by an insulating film and an alignment film which are selected and disposed to provide a combined electrostatic capacitance C (nF) and a combined resistance R ($\Omega$) satisfying a relationship with the spontaneous polarization Ps of the chiral smectic liquid crystal represented by the following formula: $3 \geq -CR[-2.3 + \ln(C/Ps)]$. As a result, there is provided a chiral smectic liquid crystal device which suppress the persistence to a tolerable level while retaining a good switching characteristic.

9 Claims, 3 Drawing Sheets

LIQUID CRYSTAL DEVICE HAVING INSULATING AND ALIGNMENT FILMS WHEREIN THREE $\geq$ -CR[-2.3+LN(C/PS)]

FIELD OF THE INVENTION AND RELATED ART

The present invention relates to a chiral smectic liquid crystal device (ferroelectric liquid crystal device), particularly a ferroelectric liquid crystal device provided with a novel insulating film so as to improve the viewing characteristic and prevention of short circuit between the substrates.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) of H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device.

Such a ferroelectric liquid crystal device using a chiral smectic liquid crystal is provided with an electrode matrix comprising a group of scanning electrodes and a group of data electrodes, wherein a scanning signal is sequentially applied to the scanning electrodes and data signals are applied to the data electrodes in phase with the scanning signal. Thus, the chiral smectic liquid crystal device is driven in a multiplexing manner.

An insulating film of ordinarily silicon oxide ($SiO_2$) may be disposed over the electrodes, and the thickness thereof may be 500 Å or larger in most cases. An alignment film of 100 Å or larger in thickness may be further disposed on the insulating film.

In a multiplexing drive of such a conventional ferroelectric liquid crystal device comprising a chiral smectic liquid crystal, if the combination of the insulating film and the alignment film provides a small capacitance, a switching failure can be caused due to the effect of a reverse electric field, etc., so that the capacitance should be large to some extent. For this reason, some measures have been taken inclusive of the use of a film of tantalum oxide ($Ta_2O_5$; dielectric constant=20-27) for improving the switching performance. As a result, the switching performance has been improved but another problem of persistence that a pattern before rewriting remains is caused. As a measure for solving the problem, it may be conceived of to increase the geometrical capacitance (i.e., to decrease, the thickness) of, e.g., a $Ta_2O_5$ insulating film having a high dielectric constant. However, in view of a possible short circuit between the substrates, the limit of thickness is on the order of 400 Å at the minimum.

SUMMARY OF THE INVENTION

An object of the present invention is, in view of the problem, to provide a ferroelectric liquid crystal device having removed the problem of persistence.

According to the present invention, there is provided a liquid crystal device, comprising: two groups of electrodes disposed opposite to each other and so as to intersect each other, a chiral smectic liquid crystal disposed between the two groups of electrodes, an insulating film disposed on at least one group of the electrodes, and an alignment film disposed on the insulating film; wherein the insulating film and the alignment film are selected and disposed to provide a combined electrostatic capacitance C(nF) and a combined resistance R ($\Omega$) satisfying a relationship according to the following formula:

$$3 \geq -CR[-2.3 + \ln(C/Ps)],$$

wherein Ps denotes the spontaneous polarization ($nC/cm^2$) of the chiral smectic liquid crystal.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
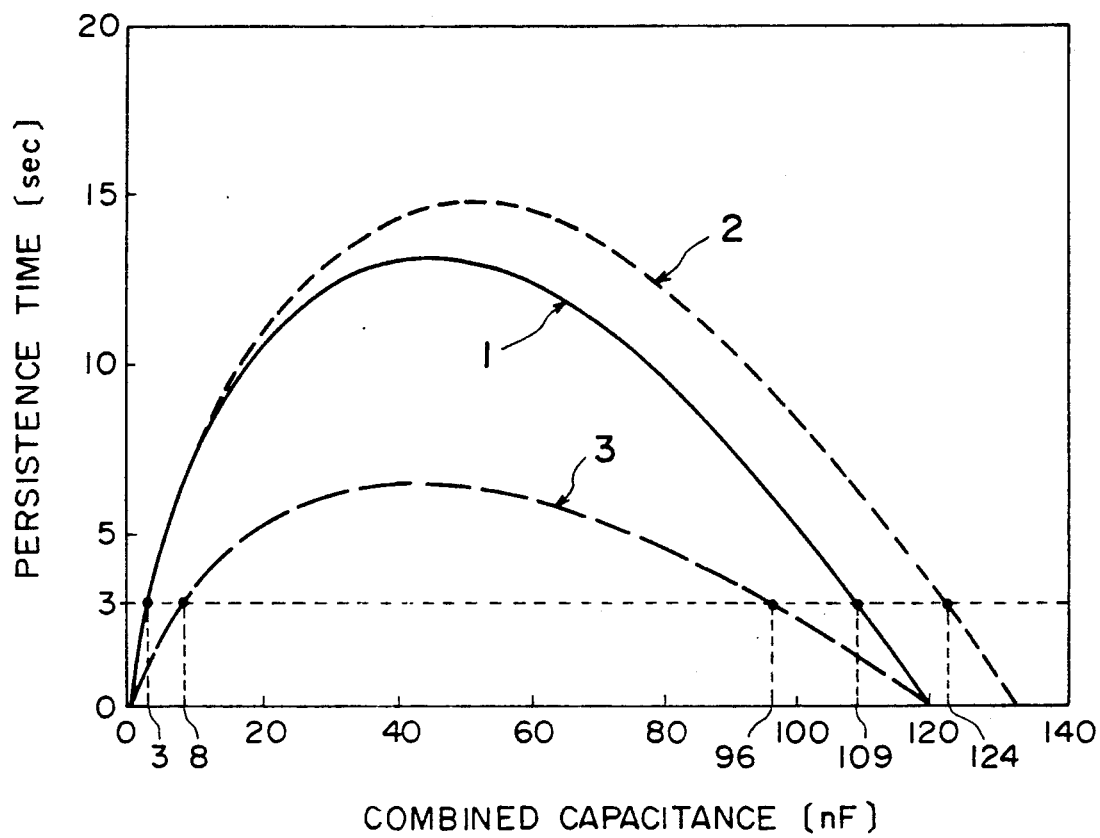
FIG. 1 is a graph showing a relationship between the persistence and the parameters, such as the combined capacitance, panel resistance and spontaneous polarization of a liquid crystal.
Figure 2:
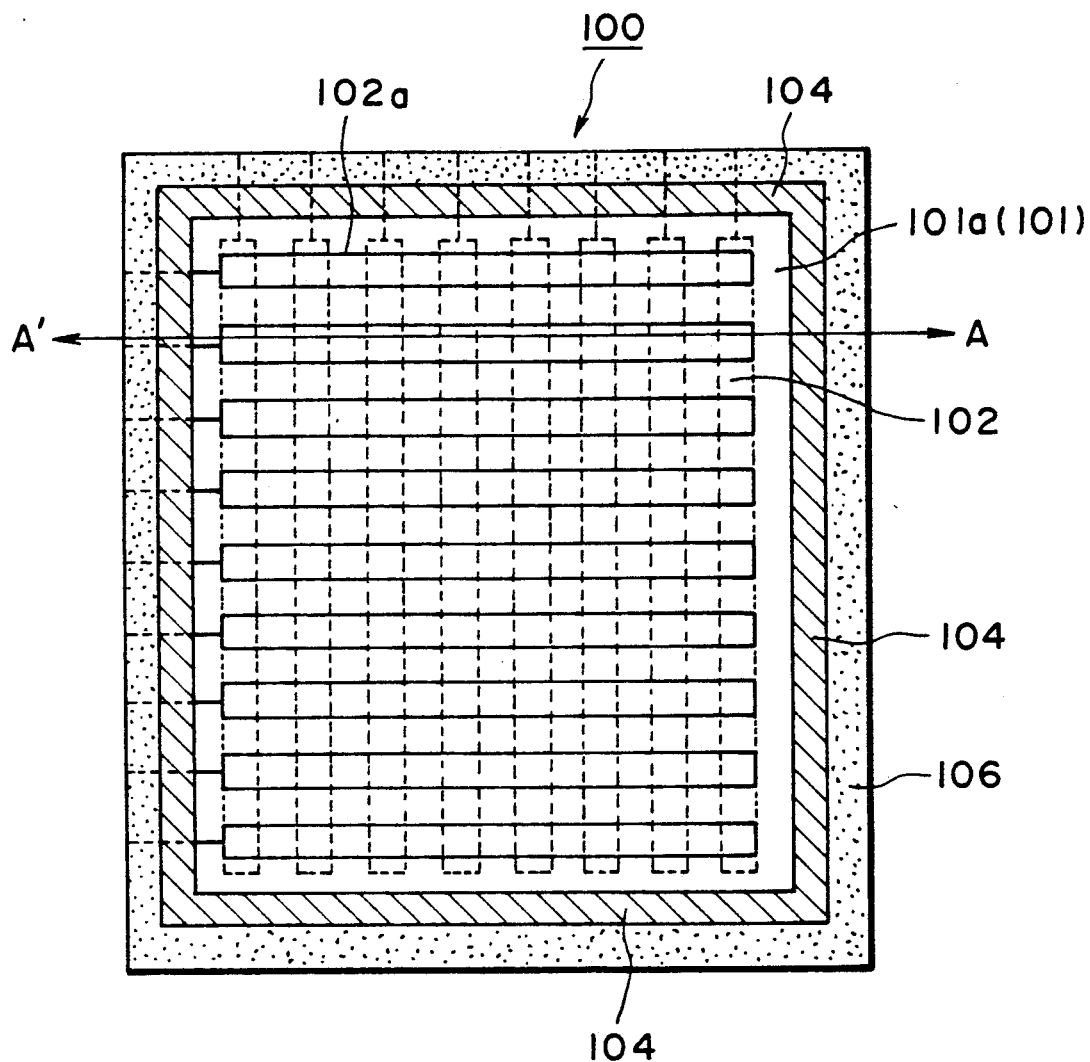
FIG. 2 is a front view of a panel including an embodiment of the ferroelectric liquid crystal device according to the present invention.

As a result of our analysis of factors relating to the persistence based on experimental data, it has been found that the persistence time is remarkably correlated with the combined capacitance of an insulating film and an alignment film used in a liquid crystal cell as shown in FIG. 2 and also correlated with the panel resistance and the spontaneous polarization of the liquid crystal used as shown in FIG. 1. Referring to FIG. 1, the combined capacitance shown on the abscissa is a combination of the capacitances of an insulating film and an alignment film formed on both substrates respectively calculated based on the equation of $C = \epsilon_0 \epsilon \cdot S/d$ wherein C denotes the capacitance of the insulating film (or alignment film); $\epsilon_0$ is a constant of $8.85 \times 10^{-14}$ F/cm; $\epsilon$ denotes the dielectric constant of the insulating film (or alignment film); d denotes the thickness of the insulating film (or alignment film); and S denotes the area at the time of measurement. $SiO_2$ constituting the insulating film has a dielectric constant of about 3.5 −5.0, and a thickness of 400 Å or larger. $Ta_2O_5$ is as described above. Further, an ordinary alignment film of polyimide, etc., has an $\epsilon$ of about 3.5-5.5 and a thickness of 100 Å or larger. As a result of calculation based on these values, the combined capacitance of the insulating film and the alignment film is ten and several nF to 40 nF in case of $SiO_2$ and about 40-65 nF in case of $Ta_2O_5$. Referring to FIG. 1, the curve 1 represents a relationship between the persistence time and the combined capacitance (including contributions of the insulating film and the alignment film formed on both substrates of a chiral smectic liquid crystal device using a liquid crystal with a Ps of 8.9 $nC/cm^2$ when the panel resistance (which is reduced to that of the liquid crystal when the resistances of the insulating film and the alignment film are sufficiently high (ordinarily, on the order of $10^{12}$ ohm)) is $3\times 10^{10}$ ohm. The curve 2 represents a similar relationship in a system where Ps is 9.9 nC/cm$^2$. The curve 3 represents a similar relationship in a system similar to that of the curve 1 in which however the panel resistance is reduced to a half by using a liquid crystal having a resistance of $1.5\times 10^{10}$ ohm.

time is decreased to 3 sec or shorter, if the combined capacitance is $\geq 109$ nF (or $\leq 3$ nF). Similarly, the persistence time is decreased to 3 sec or shorter if the combined capacitance is $\geq 124$ nF (or $\leq 3$ nF) in the case of the curve 2 and if the combined capacitance is $\geq 96$ nF (or $\leq 8$ nF) in the case of the curve 3.

In the above, the chiral smectic liquid crystal having a Ps of 8.9 nC/cm$^2$ is a composition comprising the following compounds as principal components:

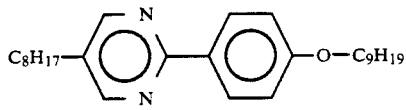

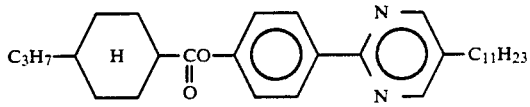

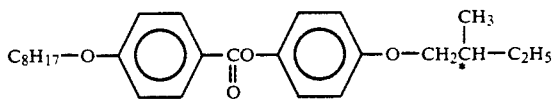

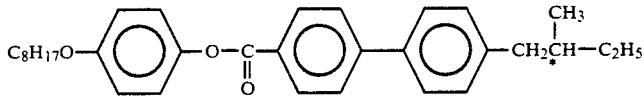

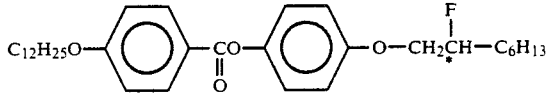

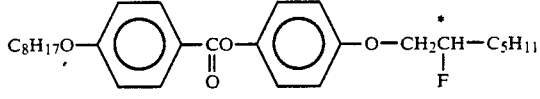

Generally, the persistence time may suitably be 3 sec or shorter. According to FIG. 1, in the case of a liquid crystal cell represented by the curve 1, the persistence Further, the chiral smectic liquid crystal having a Ps of 9.9 nC/cm$^2$ is a composition comprising the following compounds as principal components:

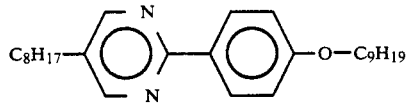

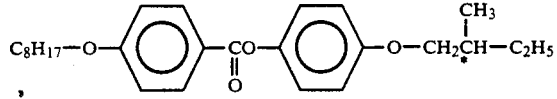

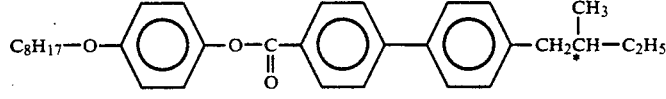

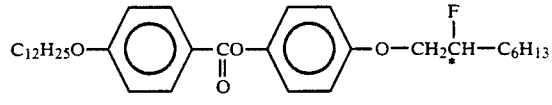

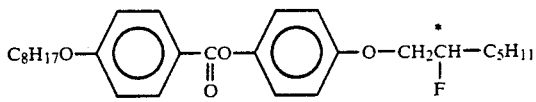

The curves shown in FIG. 1 can be inclusively represented by the following formula:

Persistence time $= -CR(-2.3 + \ln(C/Ps))$, wherein C denotes the combined capacitance of the insulating film and the alignment film (formed on both substrates) which is reduced to the capacitance of the alignment film in case where the insulating film is not present; R denotes the combined resistance of the insulating film and the alignment film and is represented by the formula $R = (R_{LC}^{-1} + R_{INS}^{-1})^{-1}$; and Ps denotes the spontaneous polarization of the liquid crystal From the above, it is found that the following formula (1) provides a condition for providing a liquid crystal device which shows a sufficient switching characteristic as well as a tolerable degree of persistence.

$$3 \geq -CR(-2.3 + \ln(C/Ps)) \quad (1)$$

Figure 3A:
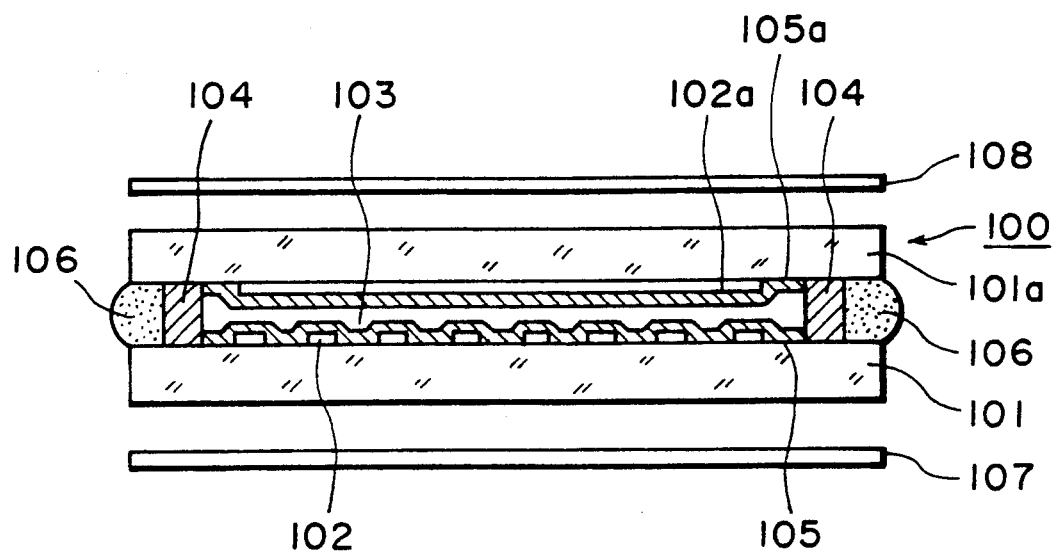
FIG. 3A and 3B are schematic sectional views taken along the line A—A' in FIG. 2, showing different embodiments of laminar structures
Figure 3B:
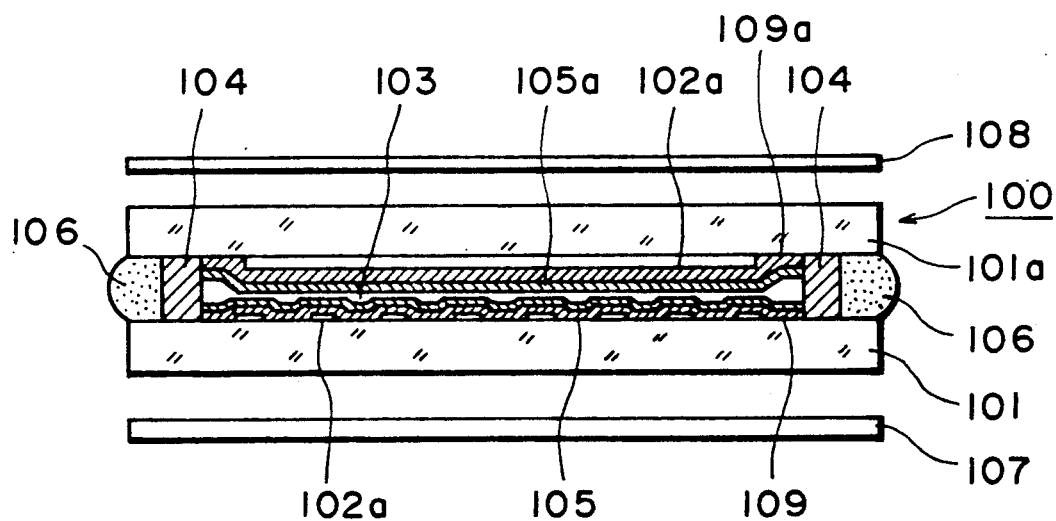

FIG. 2 is a plan view of a liquid crystal device according to the present invention, and FIGS. 3A and 3B are schematic sectional views taken along the line A—A' in FIG. 2 showing different laminar states.

A cell structure 100 shown in FIGS. 2 and 3 comprises a pair of substrates 101 and 101a made of glass plates or plastic plates which are held with a predetermined gap with spacers 104 and sealed with an adhesive 106 to form a cell structure. On the substrate 101 is further formed an electrode group (e.g., an electrode group for applying scanning voltages of a matrix electrode structure) comprising a plurality of transparent electrodes 102 in a predetermined pattern, e.g., of a stripe pattern. On the substrate 101a is formed another electrode group (e.g., an electrode group for applying signal voltages of the matrix electrode structure) comprising a plurality of transparent electrodes 102a intersecting with the transparent electrodes 102.

In the present invention, an insulating film for preventing short circuit may be formed to cover at least one side of the above-mentioned transparent electrodes 102 and 102a.

More specifically, the device shown in FIG. 3A comprises alignment (control) films 105 and 105A on both substrates 101 and 101a, while the device shown in FIG. 3B comprises insulating films 109 and 109a for short circuit prevention and alignment (control) films 105 and 105a on the respective substrates 101 and 101a.

In the present invention, the insulating films 109 and 109a for short circuit prevention may preferably be formed as a film of SiO$_2$ or Ta$_2$O$_5$ in a thickness of 400 Å or less, and the alignment (control) films 105 and 105a may preferably be formed as a polyimide film having a thickness of 100 Å or less, further preferably 50 Å or less.

Other examples of the material constituting the alignment control films 105 and 105a may include inorganic insulating materials, such as silicon monoxide, silicon dioxide, aluminum oxide, zirconia, magnesium fluoride, cerium oxide, cerium fluoride, silicon nitride, silicon carbide, and boron nitride; and organic insulating materials, such as polyvinyl alcohol, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin. The above-mentioned alignment (control) film of an insulating material can be also used as an insulating film for short circuit prevention. Particularly, the alignment control films 105 and 105a may preferably be formed as an inorganic insulating film which satisfactorily shows both the above-mentioned alignment control function and short circuit-preventing function.

The alignment control films 105 and 105a of an inorganic insulating material or an organic insulating material may be provided with a uniaxial orientation axis by oblique vapor deposition for formation thereof or preferably by rubbing the surface of the film after formation thereof in one direction with velvet, cloth or paper.

The liquid crystal material suitably used in the present invention is a chiral smectic liquid crystal showing ferroelectricity. More specifically, liquid crystals in chiral smectic C phase (SmC*), chiral smectic G phase (SmG*), chiral smectic F phase (SmF*), chiral smectic I phase (SmI*) or chiral smectic H phase (SmH*) may be used.

Details of ferroelectric liquid crystals may be disclosed in, e.g., LE JOURNAL DE PHYSIQUE LETTERS 36 (L-69) 1975, "Ferroelectric Liquid Crystals"; Applied Physics Letters 36 11, 1980, "Submicro Second Bi-stable Electrooptic Switching in Liquid Crystals"; Kotai Butsuri (Solid-State Physics) 16 (141) 1981, "Ekisho (Liquid Crystals)"; U.S. Pat. Nos. 4,561,726; 4,589,996; 4,592,858; 4,596,667; 4,613,209; 4,614,609; 4,622,165, etc. Chiral smectic liquid crystals disclosed in these references can be used in the present invention.

Other specific examples of ferroelectric liquid crystal may include decyloxybenzylidene-p'-amino-2-methylbutylcinnamate (DOBAMBC), hexyloxybenzylidene-p'-amino-2-chloropropylcinnamate (HOBACPC), and 4-O-(2-methyl)butylresorcylidene-4'-octylaniline (MBRA 8).

From the above formula, if a liquid crystal having Ps=8.9 nC/cm$^2$, and $R_{LC} = 3 \times 10^8$ ohm, the combined capacitance is required to be 115 nF or higher. Thus, in case where Ta$_2$O$_5$ is used to constitute an insulating film of a high dielectric constant and polyimide is used to form an alignment film, the following two combinations, for example, provide the persistence time of 3 sec or below based on calculation, and this was confirmed by measured persistence time of about 3 sec based on experimental results.

TABLE 1

|  | Ta$_2$O$_5$ | Polyimide | Combined capacitance C |
|---|---|---|---|
| Thickness | 400 Å | 74 Å | 120 nF |
|  | 500 Å | 54 Å | 130 nF |

As described above, according to the present invention, a liquid crystal, an insulating film, and an alignment film are selectively combined so as satisfy the relationship of $3 \geq -CR(-2.3 + \ln(C/Ps))$, whereby a chiral smectic liquid crystal device with a tolerable degree of persistence is provided while retaining a good switching characteristic.

What is claimed is:

1. A liquid crystal device, comprising: two groups of electrodes disposed opposite to each other so as to intersect each other, a chiral smectic liquid crystal disposed between the two groups of electrodes, an insulating film comprising tantalum oxide disposed on at least one group of the electrodes, and an alignment film disposed on the insulating film; wherein the insulating film and the alignment film are selected and disposed to provide a combined electrostatic capacitance C(nF) and a combined resistance R ($\Omega$) satisfying a relationship according to the following formula:

$$3 \geq -CR(-2.3 + \ln(C/Ps)),$$

wherein Ps denotes the spontaneous polarization (nc/cm$^2$) of the chiral smectic liquid crystal.

2. A liquid crystal device according to claim 1, wherein said insulating film has a thickness of 400 Å or larger.

3. A liquid crystal device according to claim 1, wherein said alignment film comprises a film of polyimide having a thickness of 100 Å or smaller.

4. A liquid crystal device according to claim 1, where said alignment film comprises a film of polyimide having a thickness of 50 Å or smaller.

5. A liquid crystal device according to claim 1, wherein said chiral smectic liquid crystal has a spontaneous polarization Ps of 8.5 nC/cm$^2$.

6. A liquid crystal device according to claim 1, wherein said alignment film comprises a film of polyimide having a thickness of 50 Å or smaller.

7. A liquid crystal device comprising: two groups of electrodes disposed opposite to each other so as to intersect each other, a chiral smectic liquid crystal disposed between the two groups of electrodes, an insulating film disposed on at least one group of the electrodes, and an alignment film disposed on the insulating film; wherein the insulating film and the alignment film are selected and disposed to provide a combined electrostatic capacitance C(nF) and a combined resistance R ($\Omega$) satisfying a relationship according to the following formula:

$$3 > -CR(-2.3 + \ln(C/Ps)),$$

wherein Ps denotes the spontaneous polarization (nC/cm$^2$) of the chiral smectic liquid crystal and said insulating film and alignment film provide a combined electrostatic capacitance C of 96 nF or larger.

8. A liquid crystal device according to claim 7, wherein said alignment film comprises a film of polyimide having a thickness of 100 Å or smaller.

9. A liquid crystal device according to claim 7, wherein said chiral smectic liquid crystal has a spontaneous polarization Ps of 8.5 nC/cm$^2$.

* * * * *

UNITED STATES PATENT AND TRADEMARK OFFICE
CERTIFICATE OF CORRECTION

PATENT NO. : 5,126,867
DATED : June 30, 1992
INVENTOR(S) : KAZUYA ISHIWATA

Page 1 of 2

It is certified that error appears in the above-identified patent and that said Letters Patent is hereby corrected as shown below: Title page:

AT [54] TITLE

"LN(C/PS)]" should read --ln(C/Ps)]--.

AT [56] REFERENCES CITED

Other Publications, Ikeno et al.,
"a" should be deleted.

AT [57] ABSTRACT

Line 12:
"suppress" should read --suppresses--.

COLUMN 1

Line 4, "LN(C/PS)]" should read --ln(C/Ps)]--.
Line 23, "and" should read --or--.

COLUMN 2

Line 65, "(including" should read --including--.

COLUMN 7

Line 20, "(nc/cm$^2$)" should read --(nC/cm$^2$)--.

UNITED STATES PATENT AND TRADEMARK OFFICE
CERTIFICATE OF CORRECTION

PATENT NO.  : 5,126,867
DATED       : June 30, 1992
INVENTOR(S) : KAZUYA ISHIWATA Page 2 of 2

It is certified that error appears in the above-identified patent and that said Letters Patent is hereby corrected as shown below:

COLUMN 8

Line 4, "claim 1," should read --claim 7,--.

Signed and Sealed this

Thirteenth Day of April, 1993

*Attest:*

STEPHEN G. KUNIN

*Attesting Officer*     *Acting Commissioner of Patents and Trademarks*